United States Patent [19]

Perry, Jr. et al.

[11] Patent Number: 5,919,284
[45] Date of Patent: Jul. 6, 1999

[54] GAS FILTER SEPARATOR COALESCER AND MULTI-STAGE VESSEL

[76] Inventors: Marney Dunman Perry, Jr., 904 N.W. 7th Ave., Mineral Wells, Tex. 76067; Stephen A. von Phul, 103 Golf View Cir., Weatherford, Tex. 76086; John A. Krogue, 800 Holly Hill Rd.; David J. Burns, 2901 N. Murco, both of Mineral Wells, Tex. 76067

[21] Appl. No.: 09/017,359

[22] Filed: Feb. 2, 1998

Related U.S. Application Data

[60] Provisional application No. 60/037,288, Feb. 4, 1997, abandoned.

[51] Int. Cl.[6] .............................. B01D 46/24; B01D 46/44
[52] U.S. Cl. .................................. 95/19; 55/319; 55/324; 55/423; 55/482; 55/484; 55/502; 95/24; 95/268; 95/286; 96/409; 96/414; 96/421
[58] Field of Search .................................... 95/19, 24, 20, 95/268, 273, 286, 287; 96/409, 414, 421, 412; 55/319, 324, 423, 482, 484, 502, 318, 320, 321, 323, 326, 330, 333, 392, 394, 395

[56] References Cited

U.S. PATENT DOCUMENTS

| | | | |
|---|---|---|---|
| 2,992,814 | 7/1961 | Maher | 261/23 |
| 3,212,234 | 10/1965 | McMinn | 55/38 |
| 3,228,174 | 1/1966 | Perry, Jr. | 55/45 |
| 3,349,547 | 10/1967 | Hoipkemeier | 55/324 |
| 3,713,279 | 1/1973 | Moore | 55/319 |
| 3,793,812 | 2/1974 | Willis | 55/338 |
| 3,808,775 | 5/1974 | Heller et al. | 55/269 |
| 3,888,644 | 6/1975 | Holland et al. | 55/318 |
| 4,006,000 | 2/1977 | Tortorici et al. | 55/323 |
| 4,180,391 | 12/1979 | Perry, Jr. et al. | 55/324 |
| 4,297,116 | 10/1981 | Cusick | 55/319 |
| 4,359,329 | 11/1982 | Willeitner | 55/186 |
| 4,692,175 | 9/1987 | Frantz | 55/218 |
| 4,865,815 | 9/1989 | Martin et al. | 422/122 |
| 4,872,890 | 10/1989 | Lamprecht et al. | 55/323 |

*Primary Examiner*—Duane S. Smith
*Attorney, Agent, or Firm*—Charles D. Gunter, Jr.

[57] ABSTRACT

The present invention relates to an apparatus for separating liquids and solids from a gas stream and simultaneously coalescing liquids from the gas stream. The apparatus includes a closed vessel having a longitudinally extending length, an initially open interior, an input port at an extent and an output port at an opposite extent thereof. There is a partition located within the vessel interior that divides the vessel interior into a first stage and a second stage. There is at least one opening in the partition. A separator/coalescer filter element is disposed within the vessel to sealingly extend from within the first stage through the opening into the second stage. There is a chevron-type seal or an O-ring seal between the filter element and the opening. The input port, vessel interior, separator/coalescer filter element and output port together define a flow passage within the apparatus, whereby the gas stream flows into the first stage through the input port and through the filter element hollow core, thereby filtering solids out of the gas stream, separating liquids from the gas stream, and pre-coalescing liquids in the gas stream. The gas stream then flows along the hollow core past the partition and back through the filter element into the second stage, thereby coalescing liquids out of the gas stream, the gas stream then exiting the second stage through the outlet port.

20 Claims, 3 Drawing Sheets

GAS FILTER SEPARATOR COALESCER AND MULTI-STAGE VESSEL

CROSS-REFERENCE TO RELATED APPLICATIONS

This application claims the benefit of U.S. Provisional Application No. 60/037,288, filed Feb. 4, 1997, now abandoned.

The present application contains material in common with U.S. patent application No. 08/547,352, filed Oct. 24, 1995, now U.S. Pat. No. 5,827,430 and Patent Cooperation Treaty International Application No. PCT/US96/16497, filed Oct. 15, 1996.

BACKGROUND ART

1. Field of the Invention

The invention relates to gas separator/coalescer filter elements and in particular gas separator/coalescer filter elements in multi-stage vessels.

2. Description of Related Art

Gas filter elements for separating solids and liquids from contaminated gas streams are well known, as are gas filter elements for coalescing entrained liquids from a gas stream. Often these types gas filters are installed in multi-stage vessels, which are in turn installed in a gas pipeline, to perform these filtering functions. For example, U.S. Pat. No. 3,888,644 issued to Holland et al. discloses an apparatus with multiple compartments. In Holland, one compartment contains filter elements for separating solids and another compartment contains different filter elements for coalescing liquids entrained in the gas stream. The same is true for U.S. Pat. No. 4,297,116 issued to Cusick. Although these and other devices are capable of filtering solids and coalescing entrained liquids from a gas stream, they require completely different types of filter elements to perform the separating and coalescing functions. This adds to the costs of the devices and makes them difficult to maintain. There is a need for an apparatus with gas separator/coalescer filter elements that only requires a single type of filter element to perform separation of solids, filtering of liquids, and coalescing of liquids.

BRIEF SUMMARY OF THE INVENTION

It is the object of the invention to provide a multi-stage vessel having replaceable tubular gas filter separator/coalescer elements that are installed through openings in a partition in the vessel. A chevron-type seal or an O-ring ensures that a gas stream flows into a first stage of the multi-stage vessel through an inlet and then through the gas filter separator/coalescer elements from the outside towards the inside. The first stage of the multi-stage vessel provides filtration of solids, separation of large liquid droplets, and pre-coalescing of liquids. The gas stream then flows through the gas filter separator/coalescer elements from the inside towards the outside into a second stage of the multi-stage vessel and out of the multi-stage vessel through an outlet. The second stage of the multi-stage vessel provides final coalescing and removal of fine liquids. The gas filter separator/coalescer elements are each surrounded by a flow diffuser in the second stage of the multi-stage vessel which directs the flow of the gas stream and provides a drainage surface for coalesced liquids. Both the first stage and the second stage of the multi-stage vessel are in fluid communication with a collection sump.

One main advantage of the present invention is that a single type of gas filter separator/coalescer element is used to perform the functions of separating solids, filtering liquids, and coalescing fluids out of the gas stream. The filter elements can be quickly and easily changed through a single opening in the multi-stage vessel, significantly reducing maintenance costs.

The above as well as additional objects, features, and advantages of the invention will become apparent in the following detailed description.

DETAILED DESCRIPTION OF THE PREFERRED EMBODIMENT

Figure 1:
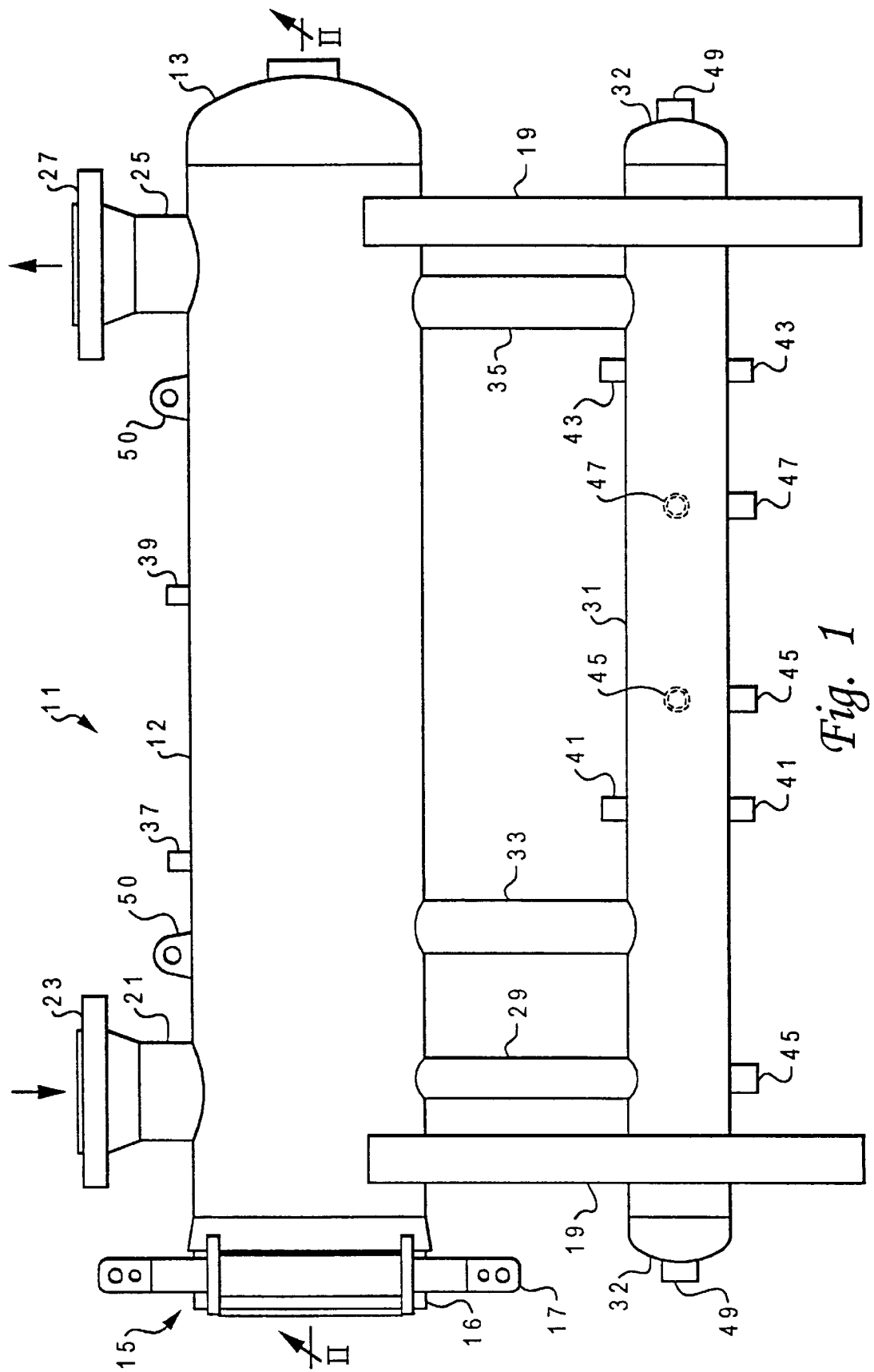
FIG. 1 is a front view of the preferred embodiment of the invention that illustrates a multi-stage vessel for gas filter separator/coalescer elements.

Referring to FIG. 1 of the drawings, the numeral 11 designates the preferred embodiment of a multi-stage vessel for gas filter separator/coalescer elements of the present invention. The multi-stage vessel 11 has a generally tubular hull 12 with one end permanently enclosed by a preferably eliptical cap 13 and the opposing end enclosed by a conventional closure member, preferably quick opening closure 15, consisting of a head 16 and conventional clamping means 17. Head 16 is releasably retained to multi-stage vessel 11 by a clamping means 17 to allow access to the interior of the hull 12 to replace and maintain gas filter separator/coalescer elements 61 (see FIGS. 2 and 3). Clamping means 17 provides a fluid-tight seal between the hull 12 and the head 16 preferably with a conventional O-ring (not shown). The hull 12 is supported by saddle supports 19.

Located on the upper side of the hull 12 near the head 16 is an inlet port 21 through which a gas stream (indicated by arrows) enters into the hull 12. The inlet port 21 terminates with a flange 23 which is fitted for connection of the multi-stage vessel 11 to conventional gas pipelines. Located on the upper side of the hull 12 near the cap 13 is an outlet port 25 through which the gas stream exits the hull 12. The outlet port 25 terminates with a flange 27 which is fitted for connection of the multi-stage vessel 11 to conventional gas pipelines. The multi-stage vessel 11 is preferably manufactured of steel materials which conform to published pressure vessel standards, such as ASME Boiler and Pressure Vessel Code, Section 8, Division 1.

Located on the lower side of the hull 12, near the head 16 and opening into a first stage 51 (see FIG. 2), is an inlet downcomer 29 which provides fluid communication between the interior of the hull 12 and a sump 31. Sump 31 is generally tubular and is permanently enclosed on both ends by caps 32. Located on the lower side of the hull 12, and opening into the first stage 51, is a first-stage downcomer 33 which provides fluid communication between the hull 12 and the sump 31. Inlet downcomer 29 and first-stage downcomer 33 allow drainage of solids and pre-coalesced liquids which are separated at the inlet port 21 and in the first stage 51 of the multi-stage vessel 11. Located on the lower side of the hull 12, and opening into a second stage 53 (see FIG. 2), is a second-stage downcomer 35 which provides fluid communication between the hull 12 and the sump 31. Second-stage downcomer 35 allows drainage of coalesced liquids and fine liquids which are separated in the second stage 53 of the multi-stage vessel 11. Located on the upper side of the hull 12 and opening into the first stage 51 is a first-stage pressure gauge port 37 which receives a conventional pressure gauge (not shown) for monitoring the pressure or differential pressure in the first-stage 51 of the multi-stage vessel 11. Located on the upper side of the hull 12 and opening into the second-stage 53 is a second-stage pressure gauge port 39 which receives a conventional pressure gauge (not shown) for monitoring the pressure or differential pressure in the second stage 53 of the multi-stage vessel 11.

Figure 2:
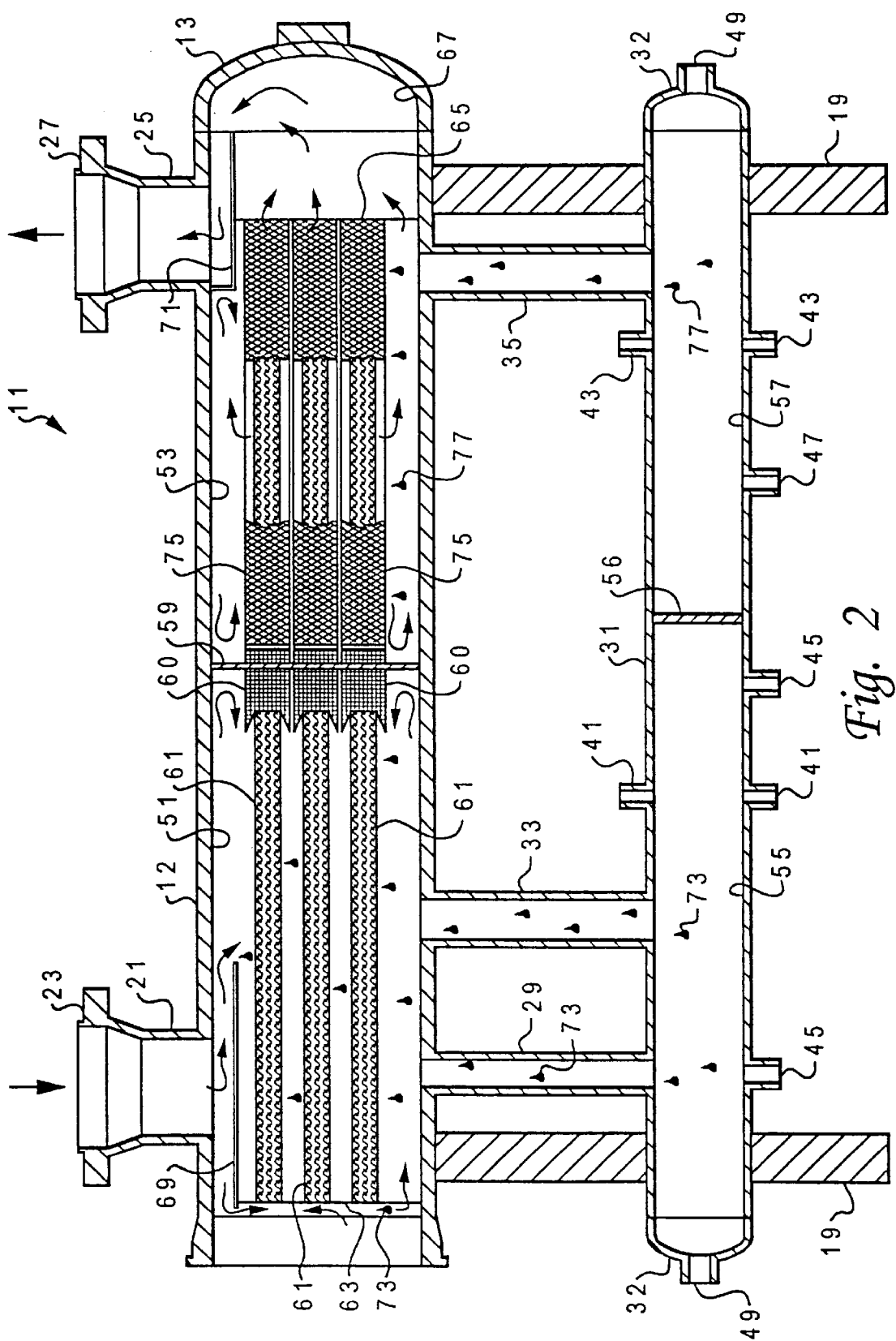
FIG. 2 is a cross-sectional view taken at II—II of the gas filter separator/coalescer elements installed in the multi-stage vessel of FIG. 1.

Referring now also to FIG. 2 in the drawings, the sump 31 is preferably divided into a first-stage compartment 55 and a second-stage compartment 57 by an impermeable baffle 56 which isolates the first-stage compartment 55 from the second-stage compartment 57. The first-stage compartment 55 collects solids and liquids which are separated from the gas stream at the inlet port 21, and solids and pre-coalesced liquids which are separated from the gas stream in the first stage 51 of the multi-stage vessel 11. The second-stage compartment 57 collects coalesced liquids and fine liquids which are separated from the gas stream in the second stage 53 of the multi-stage vessel 11.

Located opposite each other on the upper and lower sides of sump 31 and opening into the first-stage compartment 55 are first-stage compartment gauge glass connections 41 which receive a conventional gauge glass (not shown) for monitoring the liquid level in the first-stage compartment 55. Located opposite each other on the upper and lower sides of sump 31 and opening into the second-stage compartment 57 are second-stage compartment gauge glass connections 43 which receive a conventional gauge glass (not shown) for monitoring the liquid level in the second-stage compartment 57. Located on the lower and back sides of sump 31 and opening into the first-stage compartment 55 is a plurality of first-stage compartment connections 45, operated by valves (not shown), for draining or siphoning solids, liquids, and pre-coalesced liquids out of the first-stage compartment 55 of the sump 31. Located on the lower and back sides of sump 31 and opening into the second-stage compartment 57 is a plurality of second-stage compartment connections 47, operated by valves (not shown), for draining or siphoning coalesced liquids and fine liquids out of the second-stage compartment 57 of the sump 31.

Sump caps 32 contain clean-out ports 49, operated by valves (not shown), which open into the first-stage compartment 55 and the second-stage compartment 57, to allow insertion of level control instruments and other measuring devices into the first-stage compartment 55 and the second-stage compartment 57. Permanently attached to the upper side of the hull 12 is a plurality of eyelets 50 for hoisting the multi-stage vessel 11 during manufacture, transportation, installation, and maintenance.

Referring now to FIG. 2 in the drawings, the multi-stage vessel 11 is shown divided into the first stage 51 and the second stage 53 by a partition, or tubesheet 59. Tubesheet 59 forms a fluid-tight seal around the interior wall of the hull 12 and has a plurality of annular guides 60 through which the gas filter separator/coalescer elements 61 pass from the first stage 51 to the second stage 53. The tubesheet 59 and the guides 60 are preferably made of steel. The gas filter separator/coalescer elements 61 extend longitudinally along the length of the first stage 51 from a first stage support screen 63 to the tubesheet 59. The gas filter separator/coalescer elements pass through the guides 60 of the tubesheet 59 and extend longitudinally along the length of the second stage 53 to a second stage support screen 65. First stage support screen 63 and second stage support screen 65 are both preferably made of a rigid material, such as steel or expanded metal, but are perforated to allow the gas stream to flow through them. The gas stream passes through an annular space 67 between the second stage support screen 65 and the interior of the cap 13 prior to exiting through the outlet port 25.

Inlet baffle 69, located within the first stage 51, extends longitudinally from the first stage support screen 63 across the inlet port 21. Inlet baffle 69 separates some of the liquids and solids from the incoming gas stream and directs the gas stream over the gas filter separator/coalescer elements 61. In the first stage 51, the gas stream is forced through the sidewalls of the gas filter separator/coalescer elements 61 from the outside to the inside. The gas filter separator/coalescer elements 61 trap solids and pre-coalesce liquids from the gas stream creating a pressure drop across the sidewalls of the gas filter separator/coalescer elements 61. Outlet baffle 71, located within the second stage 53, extends down from the upper interior wall of the second stage 53 and longitudinally across the outlet port 25 into the annular space 67. Outlet baffle 71 directs the gas stream into the annular space 67 and out the outlet port 25.

The selected density and porosity of the gas filter separator/coalescer elements 61 prevent solids and pre-coalesced liquids from passing through the gas filter separator/coalescer element 61 and into the second stage 53 of the multi-stage vessel 11. Droplets 73 of solids and liquids separated by the inlet baffle 69 drip off the inlet baffle 69 and flow through the inlet downcomer 29 and the first-stage downcomer 33 into the first-stage compartment 55 of the sump 31. Droplets 73 of pre-coalesced liquids separated by the gas filter separator/coalescer elements 61 drip off the gas filter separator/coalescer elements 61 and flow through the inlet downcomer 29 and the first-stage downcomer 33 into the first-stage compartment 55 of the sump 31. When the collected droplets 73 of solids and pre-coalesced fluids in the first-stage compartment 55 reach a selected level, as indicated by the gauge glass connected to gauge glass connections 41, the solids and pre-coalesced fluids are drained or siphoned out of the first-stage compartment 55 of the sump 31 through the first-stage compartment connections 45.

The gas stream passes from the first stage 51 through the tubesheet 59 and into the second stage 53 along the interior of the gas filter separator/coalescer elements 61. In the second stage 53, the gas stream is forced through the sidewalls of the gas filter separator/coalescer elements 61 from the inside to the outside. The gas filter separator/coalescer elements 61 coalesce liquids from the gas stream creating a pressure drop across the sidewalls of the gas filter separator/coalescer elements 61. In the second stage 53, each gas filter separator/coalescer element 61 is concentrically surrounded by a tubular flow diffuser 75 which is attached at one end to a guide 60 of the tubesheet 59 and at the opposing end to the second-stage support screen 65. The flow diffusers 75 are preferably manufactured from a perforated steel and are dimensioned such that there is a selected clearance between each gas filter separator/coalescer element 61 and the corresponding flow diffuser 75.

As the gas stream passes through the gas filter separator/coalescer elements 61 in the second stage 53, fine droplets of liquid 77 coalesce on the fibers of the gas filter separator/ coalescer elements 61. As the gas stream exits the gas filter separator/coalescer elements 61, flow diffusers 75 prevent droplets 77 from being re-entrained into the gas stream. Coalesced liquid droplets 77 drip from the gas filter separator/coalescer elements 61 and the flow diffusers 75 and flow through the second-stage downcomer 35 into the second-stage compartment 57 of the sump 31. When the collected droplets 77 of coalesced fluid and fine liquids in the second-stage compartment 57 reach a selected level, as indicated by the gauge glass connected to the gauge glass connections 43, the coalesced fluids and fine liquids are drained or siphoned out of the second-stage compartment 57 of the sump 31 through the second-stage compartment connections 47.

Figure 3:
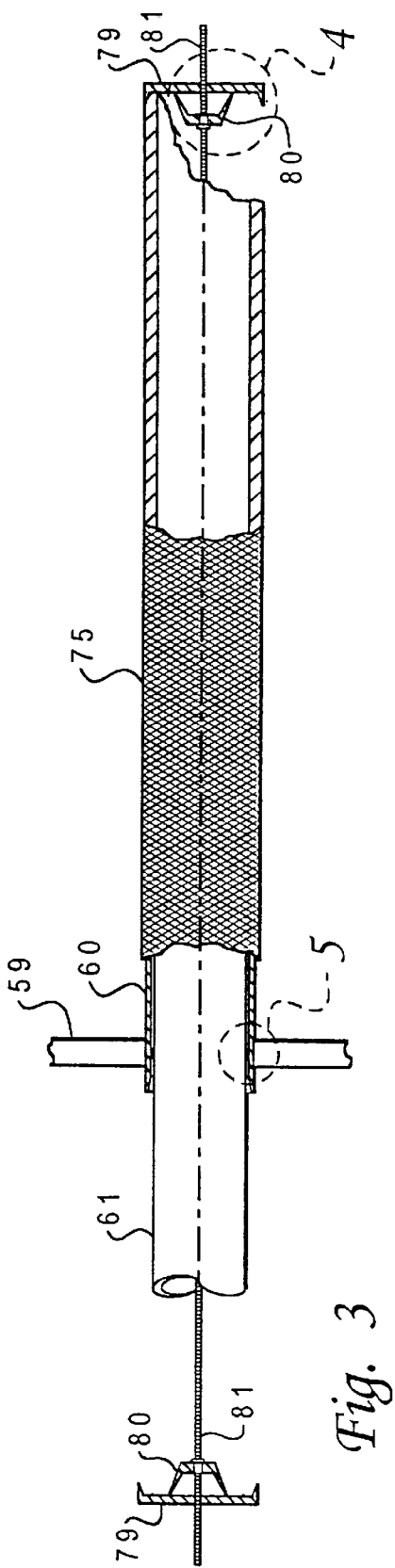
FIG. 3 is a schematic, in partial section, of a gas filter separator/coalescer element of FIG. 2.
Figure 4:
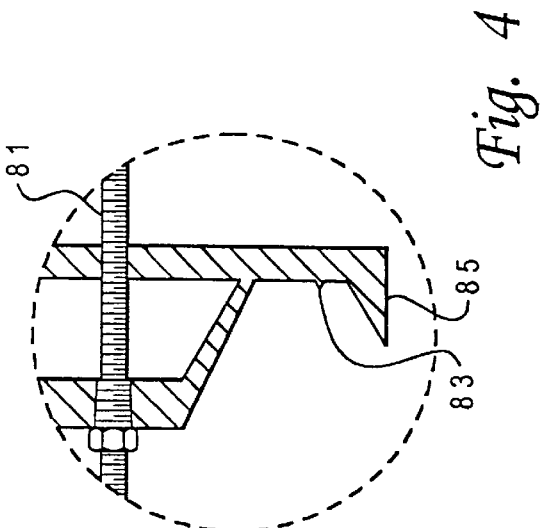
FIG. 4 is an enlarged view of the sealing cap a gas filter separator/coalescer element.

Referring now to FIG. 3 and FIG. 4 in the drawings, annular sealing caps 79 provide a fluid-tight seal at each end of each gas filter separator/coalescer element 61. The sealing caps 79 are permanently attached to the first-stage support screen 63 and the second-stage support screen 65. The sealing caps 79 have protrusions 80 which protrude into the interior of gas filter separator/coalescer elements 61 to center the gas filter separator/coalescer elements 61 on the sealing caps 79. Threaded compression rods 81 extend longitudinally through the center of the gas filter separator/ coalescer elements 61 to guide the gas filter separator/ coalescer elements 61 as they are installed in the multi-stage vessel 11. Inner teeth 83 and the outer teeth 85 of sealing caps 79 are compressed into the gas filter separator/coalescer elements 61 to prevent the gas stream from escaping through the ends of the gas filter separator/coalescer elements 61 and ensure that the gas stream passes entirely through the sidewalls of the gas filter separator/coalescer elements 61. Compression rods 81 are fastened at one end to the first-stage support screen 63 and at the opposing end to the second-stage support screen 65 with conventional fasteners (not shown).

Figure 5:
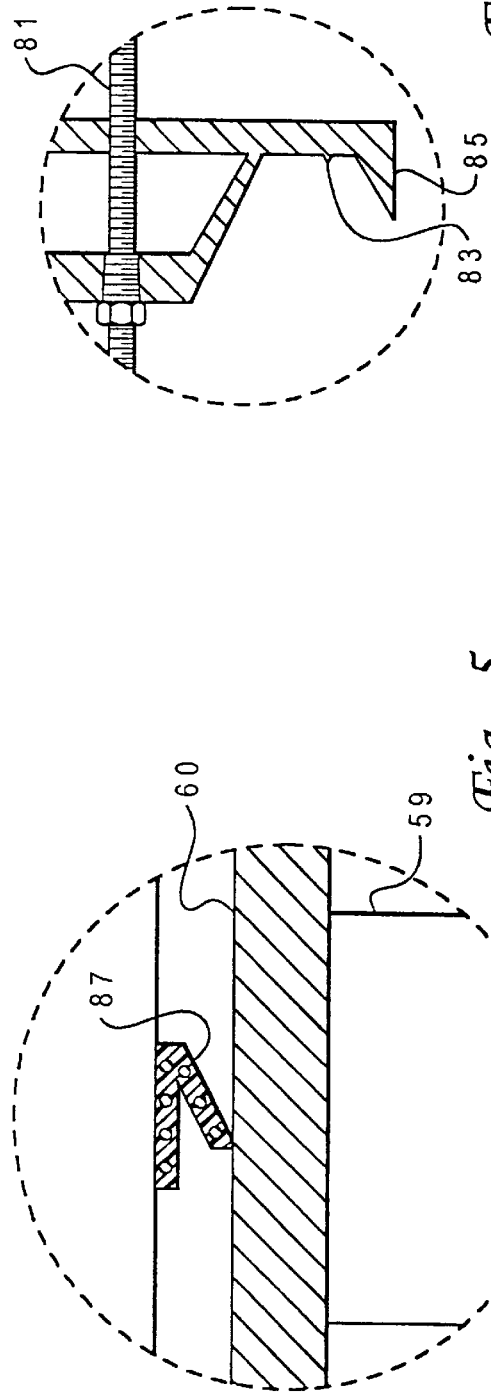
FIG. 5 is an enlarged view, in partial section of the chevron-type seal.

Referring now to FIG. 5 in the drawings, numeral 87 illustrates an annular chevron-type seal which surrounds the gas filter separator/coalescer element 61 and is compressed between the gas filter separator/coalescer element 61 and the guides 60 of the tubesheet 59. The chevron-type seal, preferably similar to the chevron-type seals commercially available from Longhorn Gasket located in Dallas, Tex., United States, provides a fluid-tight seal between the first stage 51 and the second stage 53 of the multi-stage vessel. The chevron-type seal is preferably made of an elastomer. The chevron-type seal 87 allows a single tubular gas filter separator/coalescer element 61 to filter solids and pre-coalesce liquids as the gas stream flows from outside to inside in the first stage 51 of the multi-stage vessel 11, and simultaneously coalesce fluids and fine liquids as the gas stream flows from inside to outside in the second stage 53 of the multi-stage vessel 11.

When the pressure drop across the multi-stage vessel 11, as indicated by the pressure gauges connected at the first-stage pressure gauge port 37 and the second-stage pressure gauge port 39, reaches a selected value, the gas filter separator/coalescer elements 61 are removed and either cleaned or discarded. The gas filter separator/coalescer elements 61 are removed by releasing the clamping means 17, opening the head 16 of the quick opening closure 15, and removing the fasteners which from the compression rods 81. The first-stage support screen 63 is removed to expose the sealing caps 79. The sealing caps 79 are removed from the gas filter separator/coalescer elements 61 which are then extracted from the multi-stage vessel 11 for cleaning or replacement. Cleaned or replacement gas filter separator/ coalescer elements 61 are inserted through the guides 60 of the tubesheet 59 and the sealing caps 79 are placed onto the gas filter separator/coalescer elements 61. The first-stage support screen 63 is replaced and the fasteners are tightened about the compression rods 81 to compress the inner teeth 83 and outer teeth 85 of the sealing caps 79 into the gas filter separator/coalescer elements 61. The quick opening closure is then closed and sealed with the clamping means 17 and the multi-stage vessel 11 is ready for use again.

The gas filter separator/coalescer elements 61 for use in the present invention are preferably constructed in the manner and of the materials disclosed in copending application, Ser. No. 08/547,352, filed Oct. 24, 1995, which disclosure is incorporated by reference herein. A suitable filter element for use in the present invention is the Peach™ filter commercially available from Perry Equipment Corporation of Mineral Wells, Tex. For example, in a typical application, the gas filter separator/coalescer elements 61 consist of four multi-overlapped layers of nonwoven fabric strip of varying composition. The first layer is composed of equal amounts by volume of fibers purchased from Hoechst Celanese of Charlotte, N.C., United States, sold under the fiber designation "252,""271,"and "224," has a basis weight of 0.576 ounces per square foot, is ten inches wide, and is overlapped upon itself five times. The denier of fiber "252" is 3 and its length is 1.500 inches. The denier of fiber "271" is 15 and its length is 3.000 inches. The denier of fiber "224" is 6 and its length is 2.000 inches.

The second layer is composed of equal amounts by volume of "252,""271," and "224," has a basis weight of 0.576 ounces per square foot, is eight inches wide, and is overlapped upon itself four times. The third layer is composed of equal amounts by volume of "252," "271," and "224," has a basis weight of 0.576 ounces per square foot, is eight inches wide, and is overlapped upon itself four times. The fourth layer is composed of equal amounts by volume of "252" and a fiber sold under the name "Tairilin," has a basis weight of 0.576 ounces per square foot, is six inches wide, and is overlapped upon itself three times. Fiber "252" being of the core and shell type serves as the binder fiber in each of the aforementioned blends.

The gas filter separator/coalescer elements 61 and the multi-stage vessel 11 thus manufactured can coalesce and remove 99.5% of all liquid droplets 0.3 microns and larger and can remove 99.99% of all solid particles 0.3 microns and larger at a combined pressure drop across the multi-stage vessel 11 of approximately one to three pounds per square inch gauge.

Although the multi-stage vessel 11 has been shown in a generally horizontal configuration, it should be apparent that the multi-stage vessel 11 may be configured in a generally vertical embodiment with the inlet port 21 located on the lower end and the outlet port 25 located on the upper end. In the vertical embodiment, sump 31 may be optional, in that the separated and coalesced fluids may be collected in the interior of vessel 11. It should be apparent from the foregoing that an invention having significant advantages has been provided. While the invention is shown in only one of its forms, it is not just limited but is susceptible to various changes and modifications without departing from the spirit thereof.

We claim:

1. An apparatus for separating liquids and solids from a gas stream and simultaneously coalescing liquids from the gas stream, the apparatus comprising:

a closed vessel having a longitudinally extending length, an initially open interior, an input port at an extent and an output port at an opposite extent thereof;

a partition located within the vessel interior, the partition dividing the vessel interior into a first stage and a second stage;

at least one opening in the partition; and a separator/coalescer filter element disposed within the vessel to sealingly extend from within the first stage through the opening into the second stage;

the input port, vessel interior, separator/coalescer filter element and output port together defining a flow passage within the apparatus, whereby the gas stream flows into the first stage through the input port and through the filter element hollow core, thereby filtering solids out of the gas stream, separating liquids from the gas stream, and pre-coalescing liquids in the gas stream, and wherein the gas stream then flows along the hollow core past the partition and back through the filter element into the second stage, thereby coalescing liquids out of the gas stream, the gas stream then exiting the second stage through the outlet port.

2. The apparatus according to claim 1, further comprising:
an annular chevron-type seal disposed between the filter element and the opening to prevent the gas stream from flowing from the first stage to the second stage without flowing through the filter element.

3. The apparatus according to claim 1, further comprising:
at least one sump in fluid communication with the first stage and the second stage, the sump collecting the filtered solids, the separated liquids, the pre-coalesced liquids, and the coalesced liquids.

4. The apparatus according to claim 3, further comprising:
a tubular guide member coupled to the partition and extending into the first stage, the guide member facilitating disposal of the filter element through the opening.

5. The apparatus according to claim 4, further comprising:
a tubular flow diffuser disposed in the second stage concentrically about the filter element, the flow diffuser facilitating the coalescing of the liquids.

6. The apparatus according to claim 5, further comprising:
a first support member disposed in the first stage opposite the partition, the first support member supporting the filter element; and
a second support member disposed in the second stage opposite the partition, the second support member supporting the filter element.

7. The apparatus according to claim 6, further comprising:
a first baffle member disposed in the first stage between the inlet port and the filter element;
wherein the first baffle member separates at least some liquids and solids from the gas stream, the first baffle member directing the gas stream over the filter element.

8. The apparatus according to claim 6, further comprising:
a second baffle member disposed in the second stage between the outlet port and the filter element;
wherein the second baffle member directs the gas stream out the outlet port.

9. The apparatus according to claim 3, further comprising:
a gauge in fluid communication with the sump for monitoring a level of the filtered solids, the separated liquids, the pre-coalesced liquids, and the coalesced liquids.

10. The apparatus according to claim 3, further comprising:
an outlet port in fluid communication with the sump for removing the filtered solids, the separated liquids, the pre-coalesced liquids, and the coalesced liquids from the sump.

11. The apparatus according to claim 1, wherein the filter element consists of multi-overlapped layers of non-woven fabric strips.

12. The apparatus according to claim 2, wherein the chevron-type seal is made of an elastomer.

13. The apparatus according to claim 1, further comprising:
a first pressure gauge in fluid communication with the first stage; and
a second pressure gauge in fluid communication with the second stage.

14. A method of separating liquids and solids from a gas stream and simultaneously coalescing liquids from the gas stream, the method comprising the steps of:

providing a closed vessel having a closed interior, an input port, an output port, a partition located within the closed interior, the partition dividing the vessel into a first stage and a second stage, and at least one opening in the partition;

replaceably disposing a closed, gas filter separator/coalescer element having a sidewall and a hollow core within the vessel, such that the filter element sealingly extends from within the first stage through the opening into the second stage;

directing the gas stream into the vessel first stage through the input port;

directing the gas stream through the filter element sidewalls into the hollow core, thereby filtering solids out of the gas stream, separating liquids from the gas stream, and pre-coalescing liquids in the gas stream;

directing the gas stream along the hollow core of the filter element past the partition;

directing the gas stream back out through the filter element sidewalls into the vessel second stage, thereby coalescing liquids out of the gas stream; and directing the gas stream out of the vessel second stage through the outlet port.

15. The method according to claim 1, further comprising the steps of:
providing an annular chevron-type seal disposed between the filter element and the opening, thereby preventing the gas stream from flowing from the first stage to the second stage without flowing through the filter element.

16. The method according to claim 15, further comprising the steps of:
providing a pressure gauge in fluid communication with the first stage;
providing a pressure gauge in fluid communication with the second stage;
monitoring a pressure drop across the vessel by comparing the pressure in the first stage with the pressure in the second stage; and
replacing the filter element when the pressure drop reaches a selected amount.

17. The method according to claim 15, further comprising the steps of:
providing a sump in fluid communication with the vessel for collecting the filtered solids, the separated liquids, the pre-coalesced liquids, and the coalesced liquids;
providing a gauge for monitoring a level of the filtered solids, the separated liquids, the pre-coalesced liquids, and the coalesced liquids;
providing an outlet port in fluid communication with the sump for removing the filtered solids, the separated liquids, the pre-coalesced liquids, and the coalesced liquids; and removing the filtered solids, the separated liquids, the pre-coalesced liquids, and the coalesced liquids when the level exceeds a selected amount.

18. An apparatus for separating liquids and solids from a gas stream and simultaneously coalescing liquids from the gas stream, the apparatus comprising:

a closed vessel having a longitudinally extending length, an initially open interior, an input port at an extent and an output port at an opposite extent thereof;

a partition located within the vessel interior, the partition dividing the vessel interior into a first stage and a second stage;

at least one opening in the partition; and a separator/coalescer filter element horizontally disposed within the vessel to sealingly extend from within the first stage through the opening into the second stage;

the input port, vessel interior, separator/coalescer filter element and output port together defining a flow passage within the apparatus, whereby the gas stream flows into the first stage through the input port and through the filter element hollow core, thereby filtering solids out of the gas stream, separating liquids from the gas stream, and pre-coalescing liquids in the gas stream, and wherein the gas stream then flows along the hollow core past the partition and back through the filter element into the second stage, thereby coalescing liquids out of the gas stream, the gas stream then exiting the second stage through the outlet port.

19. The apparatus according to claim 18, further comprising:

at least one sump arranged in a horizontal plane generally parallel to the horizontally extending length of the closed vessel and in fluid communication with the first stage and the second stage, the sump collecting the filtered solids, the separated liquids, the pre-coalesced liquids, and the coalesced liquids.

20. The apparatus according to claim 1, further comprising:

an O-ring seal disposed between the filter element and the opening to prevent the gas stream from flowing from the first stage to the second stage without flowing through the filter element.

* * * * *